United States Patent [19]
Kang et al.

[11] Patent Number: 5,181,109
[45] Date of Patent: Jan. 19, 1993

[54] CIRCUIT OF ELIMINATING MOTIONAL VECTOR REMAINING

[75] Inventors: Cheol S. Kang, Seongdong; Jin H. Lee, Icheon, both of Rep. of Korea

[73] Assignee: Hyundai Electronics Industries Co., Ltd., Kyeonaki, Rep. of Korea

[21] Appl. No.: 788,200

[22] Filed: Oct. 5, 1991

[30] Foreign Application Priority Data

Nov. 9, 1990 [KR] Rep. of Korea ............... 1990-18105

[51] Int. Cl.$^5$ ............................................. H04N 7/01
[52] U.S. Cl. ..................................... 358/105; 358/136
[58] Field of Search ................................ 358/105, 136

[56] References Cited

U.S. PATENT DOCUMENTS 5,018,010 5/1991 Masumoto ........................... 358/105

Primary Examiner—Howard W. Britton
Attorney, Agent, or Firm—Darby & Darby

[57] ABSTRACT

The present invention provides a circuit of eliminating motional vector remaining caused by transmission error, comprising: an input terminal for inputting an interframe motional vector; first delay device 42 connected to the input terminal, for delaying the interframe motional vector as much as a predetermined time; a zero detector 43 connected to the input terminal and to the first delay device 42, for detecting that both the delayed interframe motional vector and the interframe motional vector are continuously in zero state more than a predetermined number; and a switch 47 connected to the zero detector, for forcibly outputting zero("0") just in case that the zero detector detects zero more than the predetermined number.

2 Claims, 3 Drawing Sheets

CIRCUIT OF ELIMINATING MOTIONAL VECTOR REMAINING

BACKGROUND OF THE INVENTION

The present invention relates to a circuit of eliminating motional vector remaining caused by transmission error in compensating the motional vector of MUSE type television receiver.

The prior art for subsample interpolation equipment of compensating the motional vector is shown in FIG. 1.

In FIG. 1, the reference number 1 shows video signal input terminal inputting the video signal transmitted at the standard rate of 16.2 MHz, the inputted video signal is switched at the standard rate of 32.4 MHz together with the output signal from the motion compensation field memory 4 which performs the motion compensation according to the motion vector from the motion vector input 5, and then is stored at the non-motion compensation field memory 3 which stores one frame signal at the standard rate of 16.2 MHz.

The motion vector input 5 inputs an interframe motional vector transmitted from the sending side, and the subtracter 6 computes a new interfield motional vector from the difference between the interframe motional vector inputted from the input 5 and the interframe motional vector delayed as much as one field by the interfield delay device 7.

The motion compensation field memory 8 stores one frame signal at the standard rate of 16.2 MHz from the switch 2, performs the motion compensation according to the one interfield motional vector from the subtracter 6, and its output is converted from 32.4 MHz to 24.3 MHz by the frequency converter 9, and then is interpolated between fields by the interfield interpolation filter 11 together with the output of the frequency converter 10 which converts the frequency transmitted from the switch 2.

The sample of the present field transmitted from the switch 2 is converted by the frequency converter 12, and is interpolated within field by the intra-field interpolation filter 13.

The mixer 14 mixes the outputs from the interfield interpolation filter 11 and the intra-field interpolation filter 13 according to the detected motion quantity 16, and outputs the mixed signal to the video signal output terminal 15.

As shown above, the motion vector input 5, the subtracter 6, and the interfield delay device perform the function computing motion compensation quantity of one interfield from an interframe motional vector, and an example of the operation is shown in FIG. 2.

FIG. 2 shows the motional vector diagram in case of turning again to the still picture after the panning is produced from the still picture.

In FIG. 2, X axis shows the horizontal axis of the picture and Y axis shows the vertical axis thereof.

Each field of the video signal is shown as the points c0, d0, a1, c1, d1, a2, b1, etc.

The interfield motional vector is shown as the vectors $\vec{A1}$, $\vec{B1}$, $\vec{C1}$, etc., and the computed one interfield motion compensation vector is shown as the vectors $\vec{a1}$, $\vec{a2}$, $\vec{c1}$, $\vec{d1}$, etc.

For example, the vector $\vec{A1}$ is the motional vector compensating a1 field as based on c1 field and the vector $\vec{B1}$ is the motional vector compensating a1 field as based on b1 field. Between the vectors $\vec{C1}$, $\vec{A1}$, $\vec{D1}$ ... and the vectors $\vec{c1}$, $\vec{a1}$, $\vec{d1}$, ..., the following equations are formed.

$$\vec{A1} = \vec{a1} + \vec{b1}, \vec{B1} = \vec{b1} + \vec{c1}, \ldots,$$

or $$\vec{a1} + \vec{A1} = \vec{b1}, \vec{b1} + \vec{B1} = \vec{c1}, \ldots$$

In FIG. 2, c0 — a1 field shows the still picture, b1 — c2 field shows the panning, and d2 — a4 field shows the still picture. Therefore, if the panning is produced in the still picture, $$\vec{C0} = 0, \vec{D0} = \vec{a1}, \vec{A1} = \vec{a1} + \vec{b1}, \ldots$$

$$\vec{a1} = \vec{D0}, \vec{b1} = \vec{A1} - \vec{b1}, \ldots$$

In case of turning to the still picture after the panning, $$\ldots, \vec{A2} = \vec{a2} + \vec{b2}, \vec{B2} = \vec{b2} + \vec{c2}, \vec{C2} = \vec{c2}, \vec{D2} = 0, \ldots$$

$$\ldots, \vec{a2} = \vec{A2} - \vec{b2}, \vec{b2} = \vec{B2} - \vec{c2}, \vec{c2} = \vec{C2}, \vec{d2} = 0, \ldots$$

By the said computation, one interfield motional vector is obtained from an interframe motional vector being transmitted.

This prior art can obtain an interfield motional vector from an interframe motional vector, but it had a problem remaining the transmitting error due to the feedback loop for computing the interfield motional vector.

To express that relation by a numerical formula, the interframe motional vector transmitted at the nth field is defined as $\vec{M[n]}$, and the interfield motional vector computed by an operation is defined as $\vec{m[n]}$.

According to this definition, $$\vec{m[n+1]} = \vec{M[n]} - \vec{m[n]} \tag{1}$$

If the interfield motional vector including an error ($\vec{e[n]}$) at the nth field is defined as $\vec{m[n]}$, $$\vec{m[n+1]} = \vec{m[n]} + \vec{e[n]} \tag{2}$$

The interfield motional vector at the [n+1]th filed, $$\vec{m[n+1]} = \vec{M[N]} - \vec{m[n]} \tag{3}$$

Here, if the formula (3) is replaced by the formula (2), $$\vec{m[n+1]} = \vec{M[n]} - \{\vec{m[n]} + \vec{e[n]}\}$$

$$\vec{m[n+1]}\vec{e[n+1]} = \vec{M[n]} - \{\vec{m[n]} + \vec{e[n]}\}.$$

The error component included at the interfield motional vector of the [n+1]th field, $$\vec{e[n+1]} = -\vec{e[n]}.$$

If this is again expressed by the error ($\vec{e[0]}$) included at $\vec{m[0]}$ as the transmitting error produced in transmitting the first state M[1], $$\vec{e[n+1]} = \vec{e[0]} (-1)^{n+1}$$

$$\lim_{\eta \to \infty} |\vec{e[n+1]}| = |\vec{e[0]}|$$

Accordingly, the first error $\vec{e[0]}$ is not reduced, and is remained.

FIG. 3 is a diagram of showing an influence of the motional vector transmission error. In FIG. 3, an error vector $\vec{e}$ shows that an error adds in transmission of the motional vector $\vec{A1}$. And also a solid line shows the interframe being transmitted, a broken line shows the interfield motional vector obtained by operation, and a dashed line shows the motional vector in case that an error doesn't exist. As shown in FIG. 3, the transmission error vector $\vec{e}$ has continuously an influence on correction of the interfield motional vector, also has an influence on the still picture by continuous vibration ($+\vec{e}, -\vec{e}$) after d2 field of the ending of panning, and then finally it causes degradation on picture quality. Besides, in case that continuous errors are produced on the motional vectors being transmitted, the errors are remaining, are summed up, and it causes worse degradation.

SUMMARY OF THE INVENTION

It is an object to provide a circuit of eliminating motional vector remaining caused by transmission error.

To achieve said object, the invention provides a circuit of eliminating motional vector remaining caused by transmission error, comprising: an input terminal for inputting an interframe motional vector; first delay means connected to the input terminal, for delaying the interframe motional vector as much as a predetermined time; a zero detector connected to the input terminal and to the first delay means, for detecting that both the delayed interframe motional vector and the interframe motional vector are continuously in zero state more than a predetermined number; and switching means connected to the zero detector, for forcibly outputting zero("0") just in case that the zero detector detects zero more than the predetermined number.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE PREFERRED EMBODIMENTS

Figure 1:
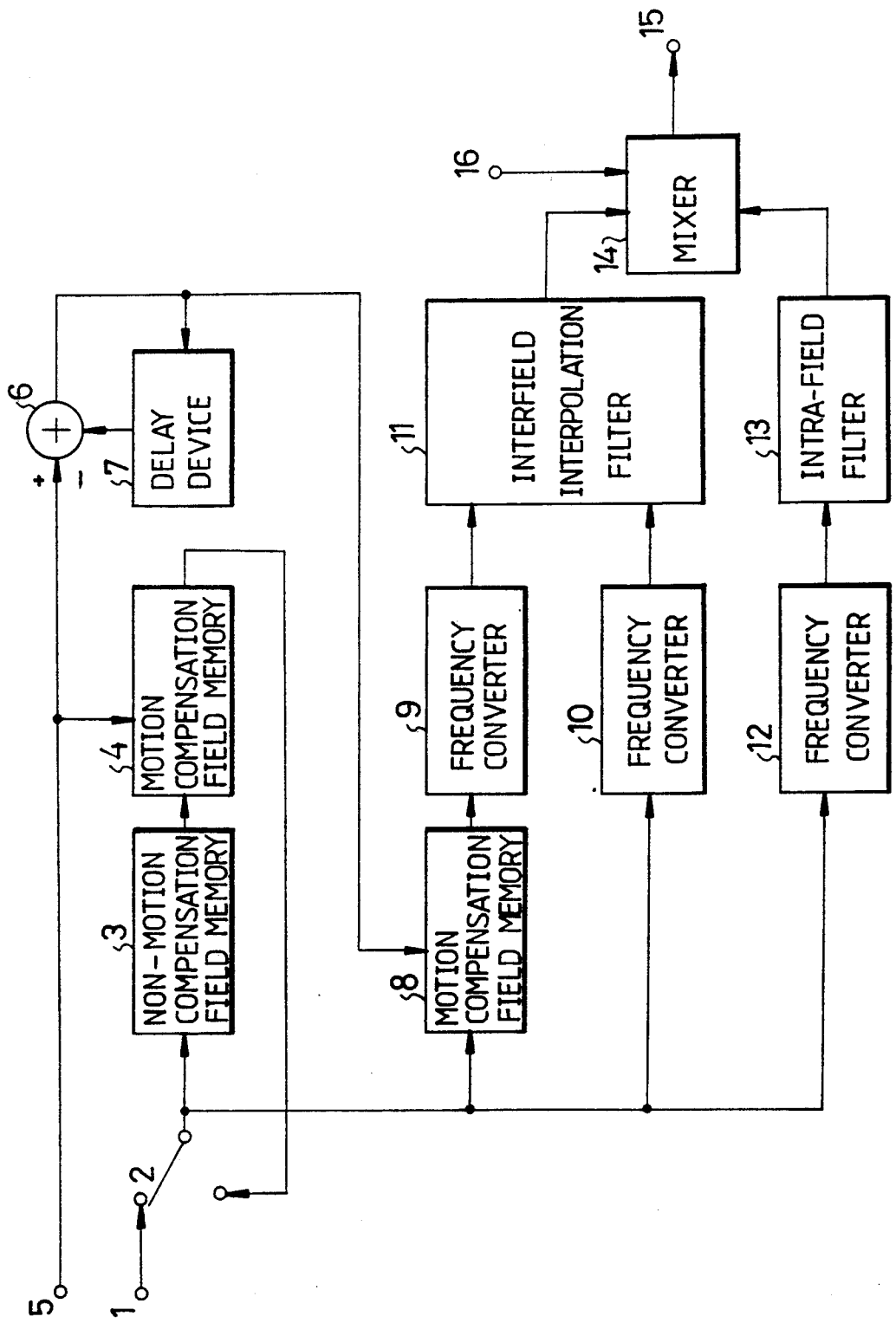
FIG. 1 is a construction diagram of the prior art subsample interpolation equipment.
Figure 2:
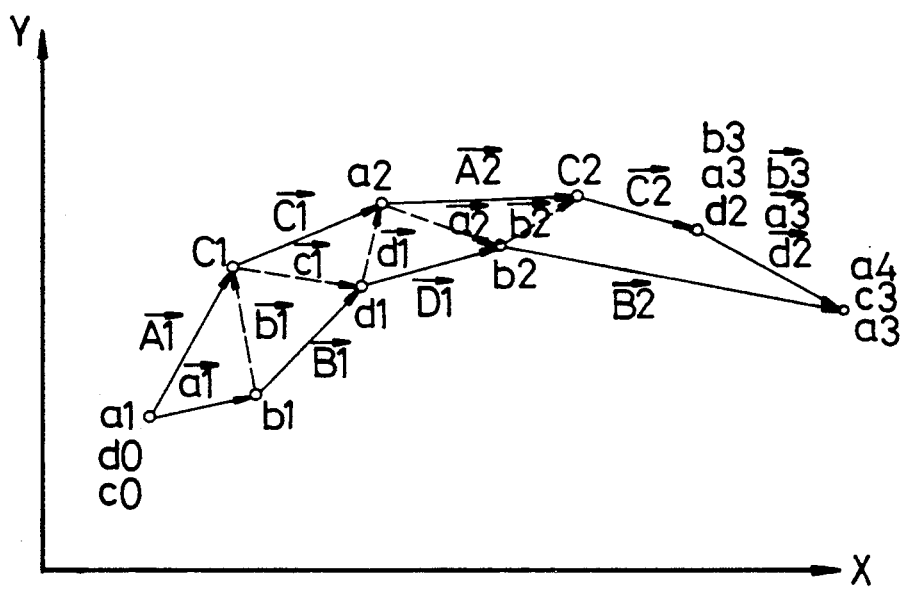
FIG. 2 and FIG. 3 are diagrams of illustrating the motional vector remaining in the prior art.
Figure 3:
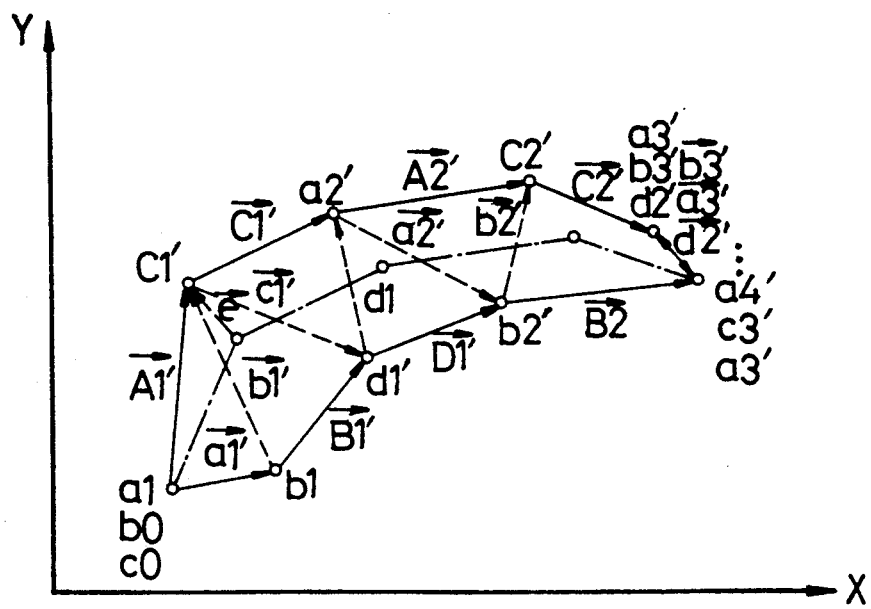
Figure 4:
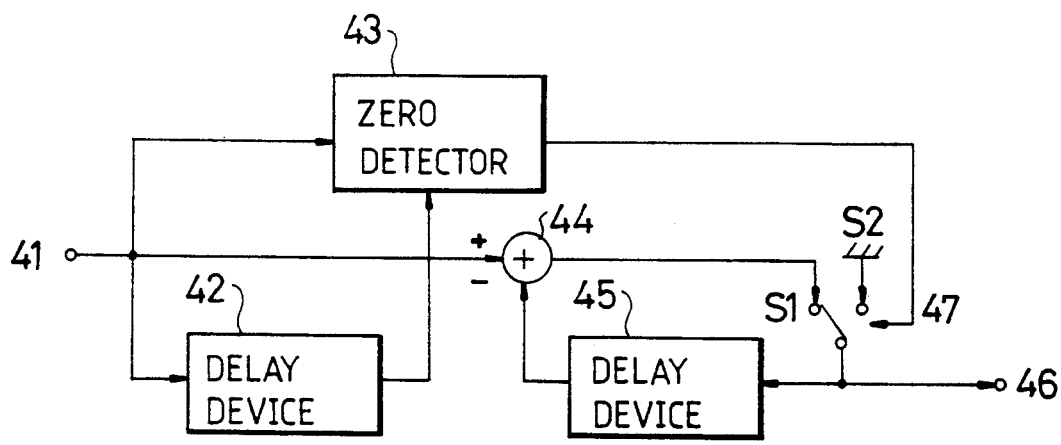
FIG. 4 is a construction diagram of the present invention.

FIG. 4 is a construction diagram of the present invention, and in FIG. 4, the reference number 41 shows an input terminal, 42 one field delay device, 43 a zero detector, 44 a subtracter, 45 one field delay device, 46 an output terminal, and 47 a switch, respectively.

The input terminal 41 inputs an interframe motional vector, and the inputted motional vector is delayed one field by the delay device 42. The zero detector 43 detects that both the motional vector inputted from the input terminal 41 and the one field delayed motional vector are in zero("0") state, and then finally detects that the inputted motional vector are in zero state twice continuously.

The delay device 45 delays the motional vector inputted from the input terminal 41 as much as one field, and the delayed motional vector is inputted to the subtracter together with the interframe motional vector inputted from the input terminal 41. The switch 47 is connected to the terminal(S2) in case that the detector 43 detects the zero state twice or more than twice, and outputs zero("0"), or otherwise the switch 47 is connected to the terminal(S1) and outputs the subtracting result from the subtracter 44.

Figure 5:
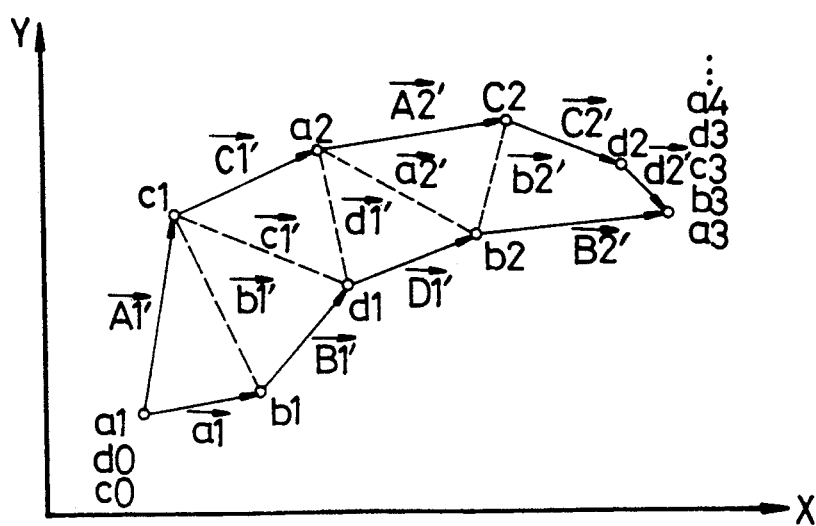
FIG. 5 is a diagram of illustrating the motional vector in the invention.

FIG. 5 is a diagram of illustrating the motional vector in the invention, and in FIG. 5, c0 through a1 fields show the still picture, b1 through c2 fields show the panning, and d2 through a4 fields show the motional vector in case of turning to the still picture.

As shown in FIG. 5, in case that it turns to the still picture from the panning though an error in transmission of the interframe motional vector $\vec{A1}$ is produced, that is, in case that both the interframe motional vector from d2 field and the motional vector from B3 field are "0", the zero detector 43 detects "0" and the switch is connected to the terminal(S2), and therefore the output of interfield motional vector becomes "0".

Accordingly, after B3 field, the size of the interfield motional vector becomes "0" and this can eliminate an influence of transmission error remaining of the motional vector, and therefore it has a good effect on the picture quality.

What is claimed is:

1. A circuit of eliminating motional vector remaining caused by transmission error, comprising:
    an input terminal for inputting an interframe motional vector;
    first delay means connected to the input terminal, for delaying the interframe motional vector as much as a predetermined time;
    a zero detector connected to the input terminal and to the first delay means, for detecting that both the delayed interframe motional vector and the interframe motional vector are continuously in zero state more than a predetermined number; and
    switching means connected to the zero detector, for forcibly outputting zero("0") just in case that the zero detector detects zero more than the predetermined number.

2. A circuit of eliminating motional vector remaining according to claim 1, further comprising:
    second delay means for delaying the interframe motional vector as much as the predetermined time, and subtracting means connected to the input terminal, the switching means and the second delay means, for subtracting the delayed interframe motional vector from the interframe motional vector.

* * * * *